United States Patent Office 2,772,161
Patented Nov. 27, 1956

2,772,161

PHOTOGRAPHIC EMULSIONS AND NEW COUPLING COMPOUNDS

Anthony Loria and Edward T. Pesch, Rochester, N. Y., assignors to Eastman Kodak Company, Rochester, N. Y., a corporation of New Jersey No Drawing. Application October 14, 1954,
Serial No. 462,364

11 Claims. (Cl. 96—55)

This invention relates to new compounds and photographic emulsions containing them.

The new compounds of our invention can be represented by the following general formula:

I.

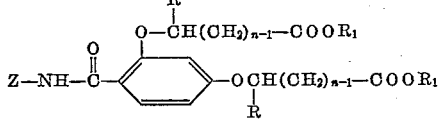

wherein R represents a hydrogen atom or an alkyl group, such as methyl, ethyl, etc., $R_1$ represents a hydrogen atom, a methyl group, or an alkali metal atom, such as sodium, potassium, etc., $n$ represents a positive integer of from 1 to 2 and Z represents an aromatic nucleus (e. g., benzene, naphthalene, etc.), said nucleus being substituted by a radical selected from the group consisting of a pyrazolone radical, i. e., a radical of the formula:

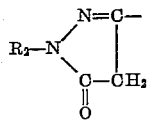

wherein $R_2$ represents an alkyl group, such as methyl, ethyl, n-propyl, etc., or an aromatic radical, such as phenyl, chlorinated phenyl, brominated phenyl, naphthyl, etc.; a phenolic radical, such as hydroxyphenyl, hydroxynaphthyl and substituted derivatives thereof; or the radical of an open chain ketomethylene compound. The portion of the molecule represented by the above general formula wherein Z is defined is well known in the art of color photography. The portion of the molecule represented by Z is that portion of the compound of Formula I which condenses with the oxidation products formed during development. Such principles are well understood by those skilled in the art of photography and our invention is to be interpreted in the light of this particular prior art. However, we have found the compounds represented by the following general formula, which compounds are embraced by Formula I above, are particularly useful for the purposes of our invention.

II.

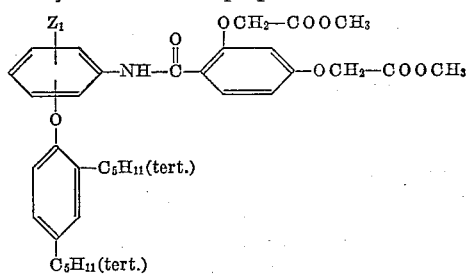

wherein $Z_1$ represents a carbanilyl radical having substituted thereon a pyrazolone radical as defined above under Z, a phenolic radical, or a radical containing an open chain ketomethylene group.

Accordingly, it is an object of our invention to provide new compounds useful in color photography. Another object is to provide a method for making such compounds. Still another object is to provide new intermediates which are useful in preparing couplers useful in color photography. Another object is to provide a method for making such intermediates. Another object is to provide photographic emulsions containing the new compounds of our invention. Other objects will become apparent from a consideration of the following description and examples.

The compounds represented by Formula II above are particularly useful in preparing solutions for incorporation in photographic emulsions inasmuch as the ester groups are easily hydrolyzed in alkaline solution (e. g., aqueous sodium hydroxide, aqueous potassium hydroxide, etc.) to produce the alkali metal salts which are quite soluble in the solutions to be added to the photographic emulsion. Also, in the event it is desired to incorporate the new compounds of our invention in photographic developing solutions, the compounds of Formula II are easily incorporated in such developing solutions by simply adding the compound to an aqueous alkaline solution as described above. Acidification of these alkaline solutions produces the free carboxylic acids, i. e., compounds of Formula I wherein $R_1$ is a hydrogen atom.

The compounds of Formula II can advantageously be prepared by condensing a compound having the following formula:

III.

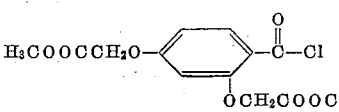

with an aminic coupling component having the following formula:

IV.             $Z$—$NH_2$ wherein Z has the values given above. These condensations are advantageously carried out in the presence of an acid-binding agent, such as alkali metal acetates, pyridine, etc., although the use of such an acid-binding agent is not necessary. The condensations are advantageously carried out in the presence of an inert solvent, such as anhydrous acetic acid, acetone, acetonitrile, xylene, diethyl ether, etc. Temperatures varying from room temperature to the reflux temperature of the reaction mixture can be employed, although we have found that it is quite convenient to simply heat the reaction mixture on the steam bath for a short period of time.

The aminic coupling components represented by Formula IV above have been previously described in the art of color photography, and as noted above, our invention is to be construed in the light of the prior art. For example, a very large number of such aminic coupling components have been previously described and it is not believed essential to enumerate this large body of material herein, inasmuch as this particular embodiment of the invention has been described in detail in a large number of U. S. patents. Typical aminic coupling components have been described in one or more of the following patents:

| Name | U.S. Patent | Date of Issue |
|---|---|---|
| Salminen et al | 2,423,730 | July 8, 1947. |
| Weissberger et al | 2,511,231 | June 13, 1950. |
| Weissberger et al | 2,589,004 | Mar. 11, 1952. |
| Loria et al | 2,600,788 | June 17, 1952. |
| Weissberger et al | 2,618,641 | Nov. 18, 1952. |

The following examples will serve to illustrate more fully the manner whereby we practice our invention.

Example 1.—2,4-bis(carbomethoxymethoxy)benzaldehyde

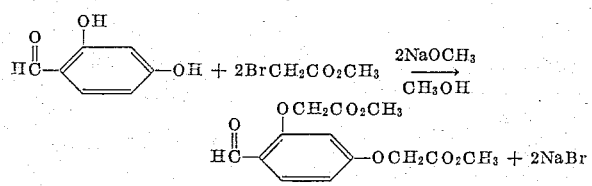

76.5 grams (0.5 mole) of methyl bromoacetate, 34.5 grams (0.25 mole) of β-resorcaldehyde, and 200 cc. of dry methanol were placed in a dry 500 cc. 3-neck flask fitted with a sealed stirrer and a condenser equipped with a calcium chloride drying tube. The third neck of the flask was fitted with a dropping funnel (a type of three-neck flask also equipped with a condenser carrying a calcium chloride drying tube).

In the dropping funnel was placed 200 cc. of absolute methanol and to it was added (in 30 minutes) 11.5 g. (0.5 mole) of clean sodium. When the sodium had reacted completely, the methoxide solution was added dropwise to the refluxing solution of the aldehyde and bromoester over a period of five hours. The reaction mixture was refluxed two hours longer, then allowed to stand over-night at room temperature. The crystalline solid which separated was filtered, washed well with water and dried. This fraction weighed 40 grams, and melted at 90–1° C.

The reaction filtrate was drowned in 1 liter of water. The solid which formed after standing one hour was filtered, washed in water, dried. This fraction weighed 13 grams, and also melted at 90–1° C.

Total yield was 53 grams or 71% of the theoretical 74.5 grams.

Example 2.—2,4-bis(carbomethoxymethoxy)-benzoic acid

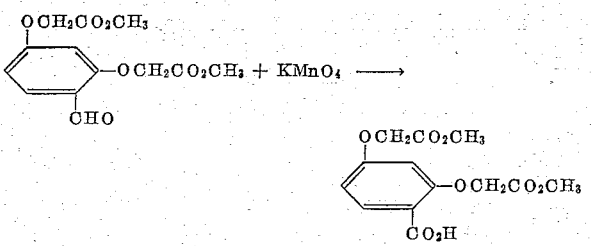

A solution of 55 g. of 2,4-bis-(carbomethoxymethoxy)-benzaldehyde in 500 ml. of acetone was added dropwise to a solution of potassium permanganate in 1 liter of water. The reaction mixture was stirred vigorously at 45–50° C. for four hours, and then sulfur dioxide gas was passed into it. The white crystalline precipitate formed was filtered, washed well with cold water and crystallized from methanol.

*Analysis.*—$C_{13}H_{14}O_8$:

|   | Calc. | Found |
|---|---|---|
| C | 52.4 | 52.6 |
| H | 4.7 | 4.7 |

Example 3.—Dimethyl-4-chloroformyl-1,3-phenylene bis(oxyacetate)

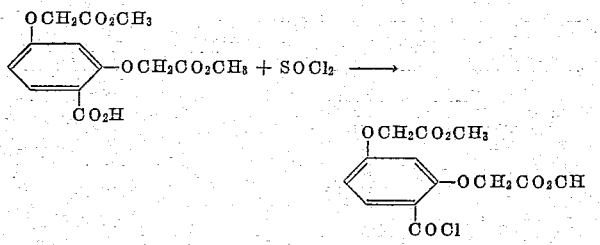

A mixture of 7.45 g. of 2,4-bis(carbomethoxymethoxy)benzoic acid and 50 ml. of thionyl chloride was shaken until complete solution had taken place, and then allowed to stand overnight. The excess thionyl chloride was removed under reduced pressure from a water bath at 30° C. until constant weight was reached and the solid residue was used without purification.

In a manner similar to that illustrated in Examples 1 to 3 above, other acid chlorides suitable for condensing with the compounds of Formula IV can be prepared. For example, the methyl bromoactate of Example 1 can be replaced by a molecularly equivalent amount of methyl β-bromopropionate, or methyl α-bromopropionate to give dimethyl-4-chloroformyl-1,3-phenylene bis(β-oxypropionate) and dimethyl-4-chloroformyl-1,3-phenyl bis(α-oxypropionate), respectively, by proceeding as outlined above in Examples 1 to 3.

Example 4.—2,4-bis(carbomethoxymethoxy)-3-nitrobenzanilide

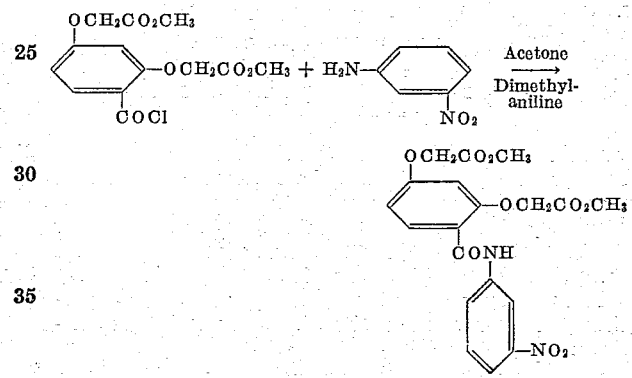

Dimethyl-4-chloroformyl-1,3-phenylene bis(oxyacetate) 9.4 g. (0.03 mole), m-nitroaniline 4.15 g. (0.03 mole) and dimethylaniline 3.6 g. (0.03 mole) were refluxed for one hour in 150 ml. of dry acetone. The reaction mixture was cooled to about 10° C. and the precipitated product was filtered, slurried in 200 ml. of cold water, filtered again and dried in a hot cabinet. The dry material was crystallized from dry ethylene glycol and a white crystalline powder melting between 195° and 197° C. was obtained.

Example 5.—2,4-bis(carbomethoxymethoxy)-3'-amino benzanilide

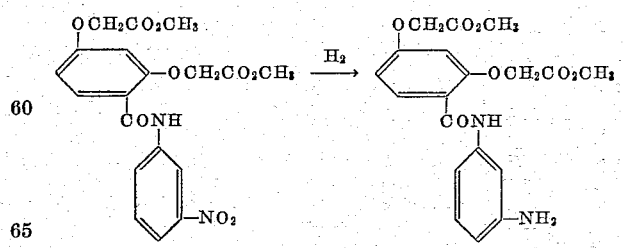

A Parr hydrogenation bottle was charged with 7 g. of 2,4-bis(carbomethoxymethoxy)-3'-nitrobenzanilide, 150 ml. of absolute ethanol, 0.5 g. of Raney nickel catalyst and 0.1 g. of sodium carbonate. The bottle was shaken on a Parr hydrogenator for one hour under 38 pounds of hydrogen pressure at room temperature. The theoretical volume of hydrogen was taken up in a short time of shaking. The catalyst was filtered out of the solution and the filtrate was evaporated to about 50 ml. and left to stand. The crystalline precipitate that formed on standing was filtered, washed with 25 ml. of cold absolute ethanol and dried. Crystallized from propanol, the product melted at 107–8° C.

Analysis.—$C_{19}H_{20}N_2O_7$:

|   | Calc. | Found |
|---|---|---|
| C | 58.7 | 59.0 |
| H | 5.2 | 5.1 |
| N | 7.2 | 7.3 |

The filtrate was cooled, the precipitate that formed was filtered, washed first with a 3% sodium acetate solution, then with water and dried. The dry product was crystallized twice from acetonitrile and melted at 208–9° C.

Analysis:

|   | C | H | Cl | N |
|---|---|---|---|---|
| Calc. for $C_{43}H_{48}Cl_2N_2O_{10}$ | 62.8 | 5.8 | 8.6 | 3.1 |
| Found | 62.3 | 5.8 | 8.4 | 3.2 |

The phenol component employed in the above example

*Example 6.—5-(2,4-dicarbomethoxymethoxybenzamido)-2 - (2,4 - ditert - amylphenoxy)benzamido - 2,4 - dichloro-3-methylphenol*

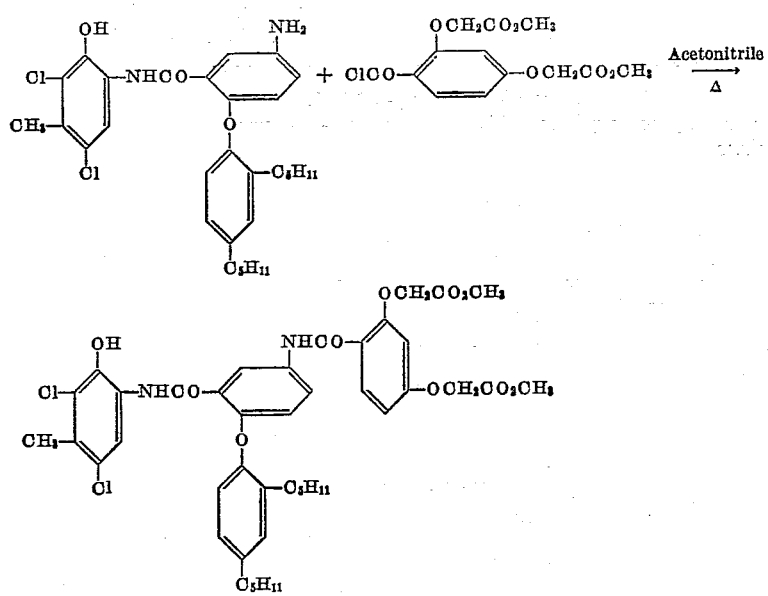

A mixture of 5.44 g. (.01 mole) of 6-[5-amino-2-(2,4 - di - tert. - amylphenoxy)benzamido] - 2,4 - dichloro-3-methylphenol and 3.06 g. (.01 mole) of 2,4-di-carbomethoxymethoxybenzoyl chloride in 150 ml. of dry acetonitrile was refluxed for 30 minutes and filtered hot.

was prepared by condensing 4-amino-2,6-dichloro-m-cresol (C. A. Vol. 35, page 3249) with 2-(2',4'-di-t-amylphenoxy)-5-nitrobenzoyl chloride, followed by reduction of the nitro group as described in U. S. Patent 2,589,004 (Example 3).

*Example 7.—1-phenyl-3-[2-(2,4-di - t - amylphenoxy)-5-(2,4 - dicarbomethoxymethoxybenzamido)benzamido]-5-pyrazolone*

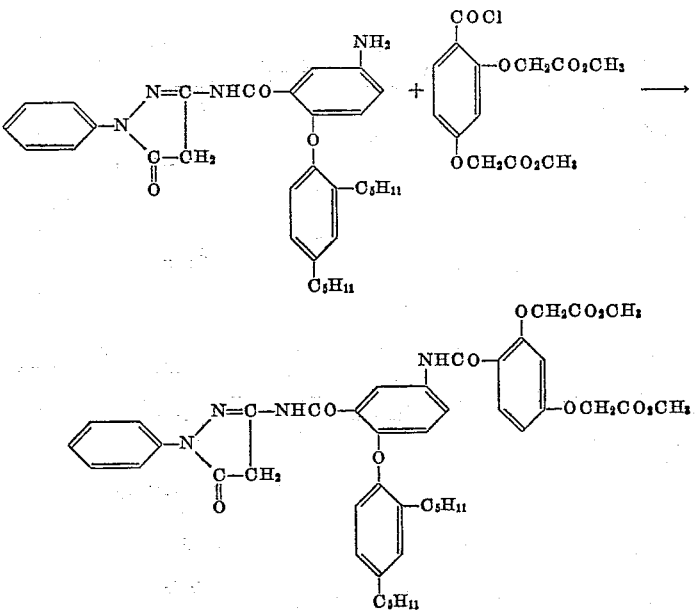

A slurry of 2.8 g. (.0043 mole) of 1-phenyl-3-[2-(2,4-di-t-amylphenoxy)-5-aminobenzamido]-5-pyrazolone in 20 cc. of dry xylene was mixed with a solution of 1.38 g. (.0045 mole) of 2,4-dicarbomethoxymethoxybenzoyl chloride in 15 cc. dry xylene. The mixture was refluxed for 2½ hours, complete solution occurring. The xylene solution was filtered hot, and poured into 50 cc. of ligroin, a precipitate separating. The solid was filtered, washed with ligroin, and recrystallized three times from benzene. There was obtained a white, crystalline solid, M. P. 186–8° C.

Analysis:

|   | Calc. | Found |
|---|---|---|
| C | 67.0 | 67.1 |
| H | 6.25 | 6.20 |
| N | 6.95 | 7.4 |

The pyrazolone component employed in the above example was prepared as described in the copending application Serial No. 260,099, filed December 5, 1951, in the names of I. Salminen and A. Weissberger, now U. S. Patent 2,694,718, issued November 16, 1954.

This compound was prepared by the same method described in Example 7. The crude product was isolated as a gum, which was then recrystallized twice from benzene yielding a light tan solid, M. P. 146–8° C.

Analysis:

| Element | Calc. | Found |
|---|---|---|
| C | 70.5 | 69.5 |
| H | 6.3 | 6.1 |
| N | 4.5 | 4.7 |

The phenolic component used in the above example was prepared as described in our copending application Serial No. 378,158, filed September 2, 1953 (now U. S. Patent 2,721,798, issued October 25, 1955).

*Example 9.—1-(2,4,6-trichlorophenyl)-3-[3-(2,4-dicarbomethoxymethoxybenzamido)benzamido]-5-pyrazolone*

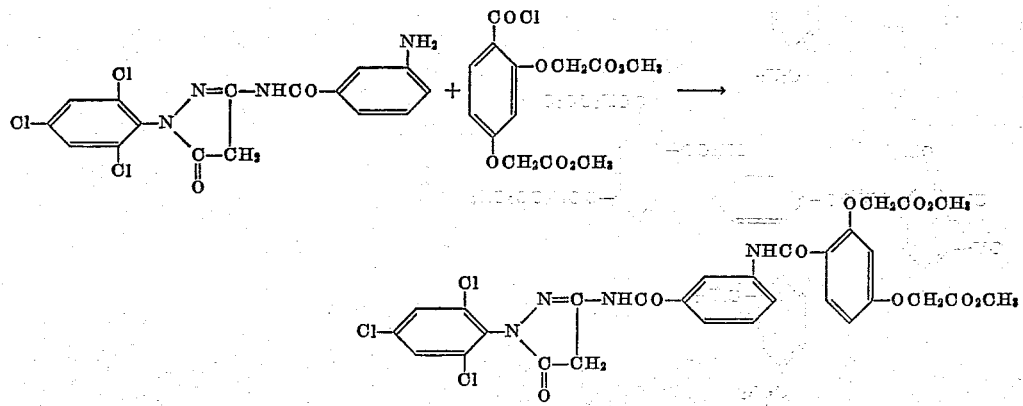

A slurry of 3.97 g. (.01 mole) of 1-(2,4,6-trichlorophenyl)-3-(3-aminobenzamido)-5-pyrazolone in 20 cc. of dry xylene was mixed with a solution of 3.1 g. (.01 mole) of 2,4-dicarbomethoxymethoxybenzoyl chloride in

*Example 8.—1-hydroxy-N-{4-[2-(2,4-di-t-amylphenoxy)-5-(2,4-dicarbomethoxymethoxybenzamido)benzamido]phenethyl}-2-naphthamide*

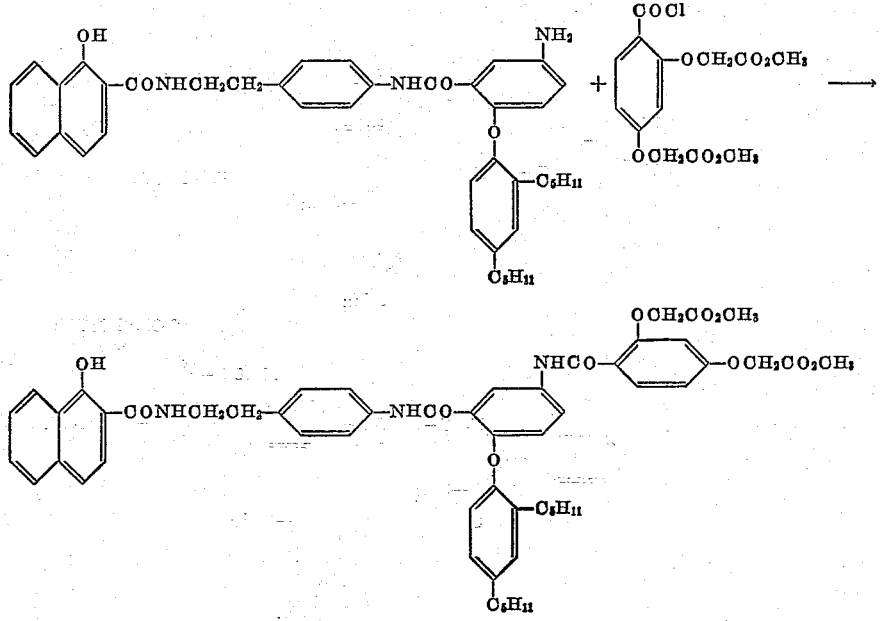

20 cc. dry xylene. The mixture was refluxed with stirring for two hours. Complete solution did not occur. The mixture was cooled, and the precipitate was filtered. The solid was pressed dry on the filter, and recrystallized from a large volume of acetonitrile. A white powdery solid was obtained, M. P. 210–3° C.

*Analysis:*

|    | Calc. | Found |
|----|-------|-------|
| C  | 52.7  | 52.3  |
| H  | 3.4   | 3.7   |
| Cl | 15.7  | 15.7  |
| N  | 8.3   | 8.7   |

The pyrazolone component used in the above example has been previously described in U. S. Patent 2,618,641.

*Example 10.*—α - (4-methoxybenzoyl)-4-{3-[2,4-bis(carbomethoxymethoxy)benzamido] phenylcarbamylmethoxy}acetanilide

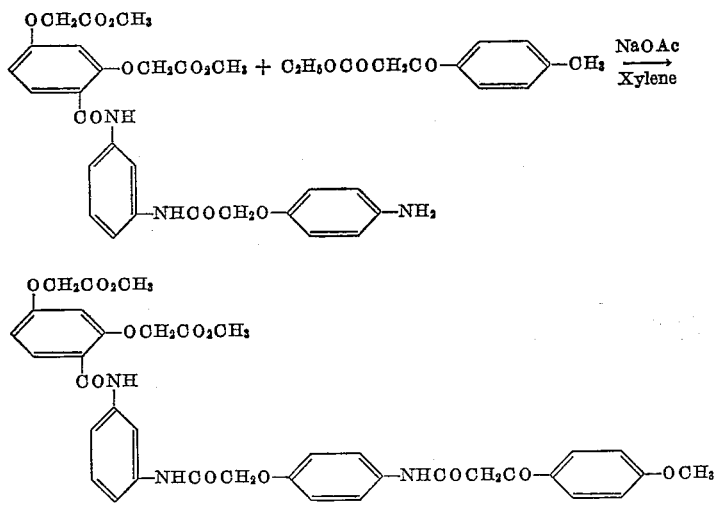

Ethyl-α-(p-methoxybenzoyl)acetate 0.46 g. (.0025 mole), 1.1 g. (.0025 mole) of 2,4-bis(carbomethoxymethoxy)-3' - [α - (4'' - aminophenoxy)acetamido]benzanilide and 0.1 g. of sodium acetate were refluxed in 35 ml. of dry xylene for one hour. During the heating a white solid had come out of solution. The mixture was cooled, the solid filtered, and washed first with petroleum ether several times and then with water and dried. The dry product was crystallized from a large volume of acetonitrile and showed a M. P. of 184–6° C.

*Analysis.*—$C_{37}H_{35}N_3O_{12}$:

|   | Calc. | Found |
|---|-------|-------|
| C | 62.0  | 62.4  |
| H | 4.9   | 5.4   |
| N | 5.9   | 5.7   |

The aromatic amine component used in the above example had a M. P. of 160–1° C. on recrystallization from dioxane and was obtained by condensing the product of Example 5 with p-nitrophenoxyacetyl chloride, followed by catalytic reduction of the resulting nitro compound with hydrogen and Raney nickel.

The couplers of the above examples are incorporated into silver halide emulsion layers, or into color developing compositions containing a primary aromatic amino developing agent in addition to the usual addenda such as alkali, antifoggants, etc. When the exposed emulsions are developed with the color developing agents in the presence of the couplers containing the pyrazolone group, magenta dye images are obtained, those couplers having phenolic hydroxyl groups such as a naphthol group give cyan dye images and those containing the open chain reactive methylene group yield yellow dye images.

When incorporating the couplers into emulsions, the ester groups of the coupler are preferably hydrolyzed by treatment with alkali in alcohol solution by the method of the Salminen et al. U. S. patent application Serial No. 774,890, published April 24, 1947 and now abandoned. The hydrolyzed coupler compound now containing both free carboxyl groups is then incorporated into the emulsion in the required quantity. The couplers may be used in emulsion layers containing gelatin or other water permeable colloid carriers such as albumin, collodion, organic esters of cellulose or synthetic resins. The emulsion may be supported by transparent medium such as glass, a cellulose ester or synthetic resin or nontransparent medium such as paper or an opaque cellulose ester. The emulsion may be coated as a single layer or as superimposed layers on one or other sides of the support. The emulsion layers of a multilayer color film containing the couplers of the invention may be differently sensitized and may be sensitized either in the natural or false orders.

A typical color developer for use in developing emulsion layers containing the coupler compounds of the invention is as follows:

| | Grams |
|---|---|
| 2-amino-5-diethylaminotoluene sulfate | 2.5 |
| Sodium sulfite (anhydrous) | 5 |
| Sodium carbonate (anhydrous) | 20 |
| Potassium bromide | 2 |
| Water to 1000 cc. | |

While the coupler compounds of the invention are primarily intended for use in emulsion layers, they can be used in color developing compositions such as given above. The couplers are incorporated into the developer compositions by first dissolving in a solvent such as isopropyl alcohol and this solution is then added to the alkaline developer composition. About three grams of coupler are suitable for use in developer compositions such as the above.

Other useful developers comprise the hydrochloride or sulfate of diethyl-p-phenylenediamine, N-methyl-p-phenylenediamine, p-aminophenol, dimethyl-p-phenylenediamine, etc.

We have also found that acidic-type couplers can be condensed with compounds of the type:

V.
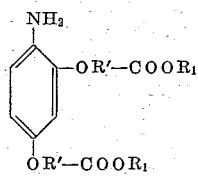

wherein $R_1$ has the values given above and $R'$ represents an alkylene group, e. g., methylene, ethylene, etc. The preparation of these couplers can be diagrammed as follows, for example:

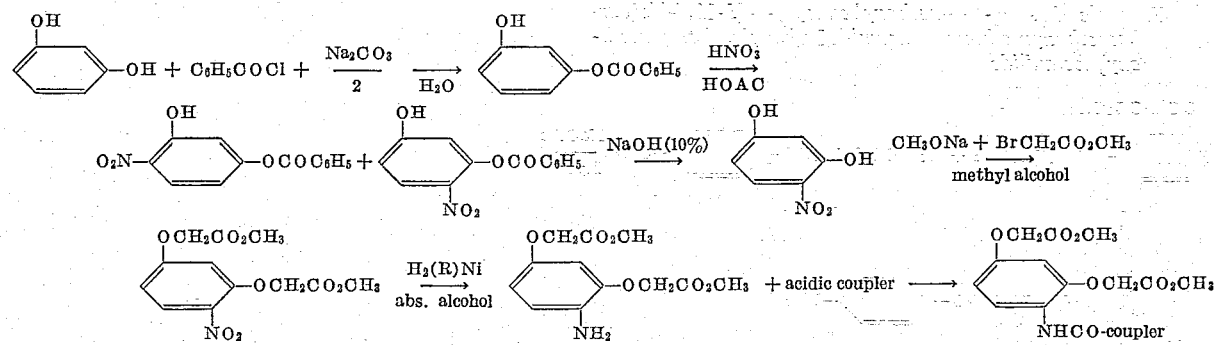

Such couplers are, in general, not nearly so useful as those represented by Formulas I and II above, however. A somewhat similar coupler which we have prepared is:

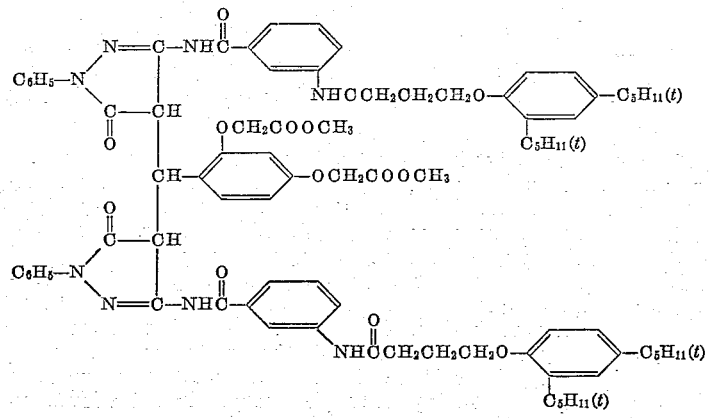

When the compounds of Formula I or II above wherein $R_1$ is a methyl group are incorporated in an aqueous photographic emulsion, spontaneous hydrolysis ensues, resulting in the formation of compounds wherein $R_1$ is hydrogen or alkali metal, depending on the pH of the emulsion.

What we claim as our invention and desire secured by Letters Patent of the United States is:

1. A photographic silver halide emulsion containing a compound selected from those represented by the following general formula:

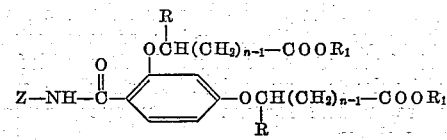

wherein R represents a member selected from the group consisting of a hydrogen atom and an alkyl group, $R_1$ represents a member selected from the group consisting of a hydrogen atom, a methyl group, and an alkali metal atom, $n$ represents a positive integer of from 1 to 2, and Z represents an aromatic radical having substituted thereon a radical which couples with the oxidation product formed during color development.

2. A photographic silver halide emulsion containing a compound selected from those having the following general formula:

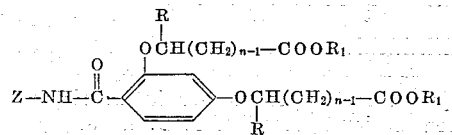

wherein R represents a member selected from the group consisting of a hydrogen atom and an alkyl group, $R_1$ represents a member selected from the group consisting of a hydrogen atom, a methyl group, and an alkali metal atom, $n$ represents a positive integer of from 1 to 2, and Z represents a mononuclear aromatic radical having substituted thereon a radical containing a pyrazolone radical represented by the following general formula:

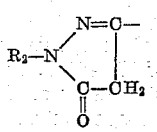

wherein $R_2$ represents a member selected from the group consisting of an alkyl group and an aromatic group.

3. A photographic silver halide emulsion containing a compound selected from those represented by the following general formula:

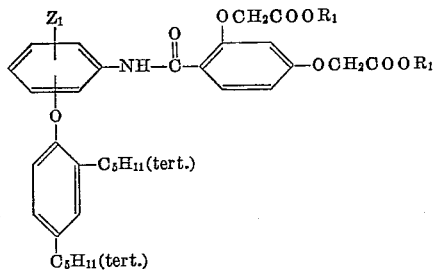

wherein $R_1$ represents an alkali metal atom and $Z_1$ represents an aromatic radical substituted by a radical containing a pyrazolone radical selected from those represented by the following general formula:

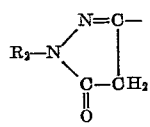

wherein $R_2$ represents a member selected from the group consisting of an alkyl group and an aromatic group; a phenolic radical and a radical containing an open chain ketomethylene group.

4. A photographic silver halide emulsion containing a compound selected from those represented by the following general formula:

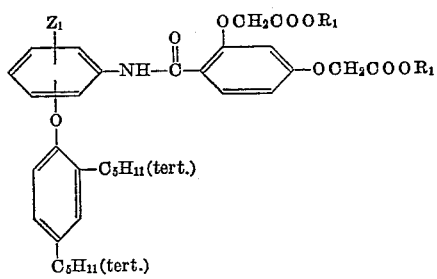

wherein $R_1$ represents an alkali metal atom and $Z_1$ represents an aromatic radical containing a radical represented by the following general formula:

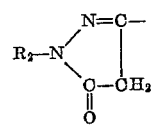

wherein $R_2$ represents a member selected from the group consisting of an alkyl group and an aromatic group.

5. A photographic silver halide emulsion containing a compound selected from those represented by the following general formula:

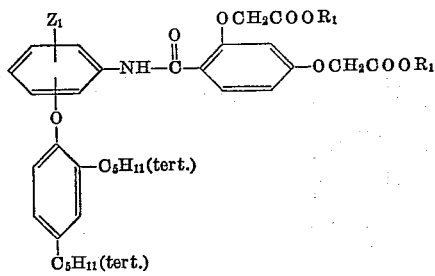

wherein $R_1$ represents an alkali metal atom and $Z_1$ represents an aromatic radical containing a phenolic radical.

6. A photographic silver halide emulsion containing a compound selected from those represented by the following formula:

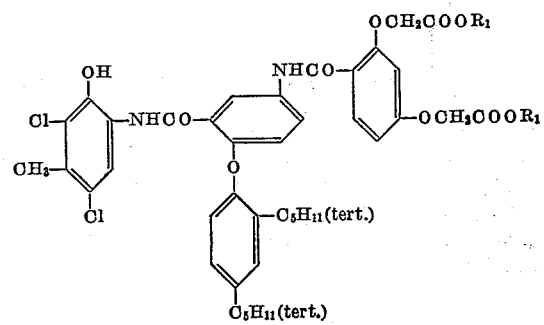

wherein $R_1$ represents an alkali metal atom.

7. A photographic silver halide emulsion containing a compound selected from those represented by the following formula:

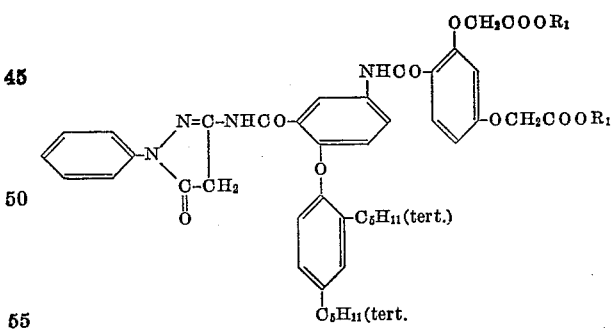

wherein $R_1$ represents an alkali metal atom.

8. A photographic silver halide emulsion containing a compound selected from those represented by the following formula:

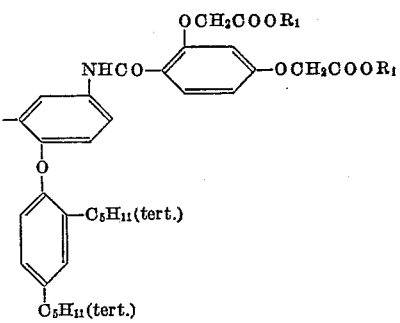

wherein $R_1$ represents an alkali metal atom.

9. A photographic silver halide emulsion containing a compound selected from those represented by the following formula:

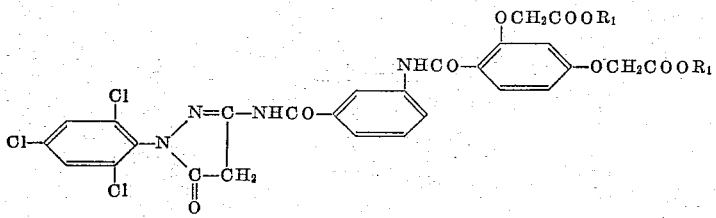

wherein $R_1$ represents an alkali metal atom.

10. A photographic silver halide emulsion containing a compound selected from those represented by the following formula:

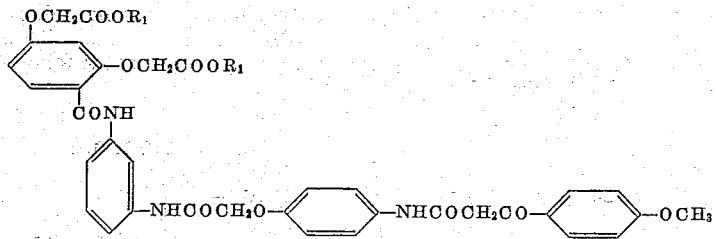

wherein $R_1$ represents an alakli-metal atom.

11. A process of color development comprising developing an exposed photographic silver halide emulsion in the presence of a color developer and a compound selected from those represented by the following general formula:

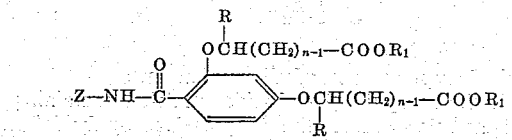

wherein R represents a member selected from the group consisting of a hydrogen atom and an alkyl group, $R_1$ represents a member selected from the group consisting of a hydrogen atom, a methyl group, and an alkali metal atom, $n$ represents a positive integer of from 1 to 2, and Z represents an aromatic radical having substituted thereon a radical which couples with the oxidation product of said color developer.

References Cited in the file of this patent
UNITED STATES PATENTS

| | | |
|---|---|---|
| 2,389,575 | Kirby et al. | Nov. 20, 1945 |
| 2,622,086 | Ledrut | Dec. 16, 1952 |
| 2,640,056 | Kendall et al. | May 26, 1953 |
| 2,657,134 | Graham et al. | Oct. 27, 1953 |